INVENTOR
BEN J. ZINK

United States Patent Office 3,481,057
Patented Dec. 2, 1969

3,481,057
DIGGER TOOTH WEDGE ASSEMBLY
Ben J. Zink, Aurora, Ill., assignor to Barber-Greene Company, Aurora, Ill., a corporation of Illinois
Filed Aug. 21, 1967, Ser. No. 661,950
Int. Cl. E02f 9/28, 3/24
U.S. Cl. 37—142                           10 Claims

ABSTRACT OF THE DISCLOSURE

A digger tooth assembly wherein a portion of a toothed element is in nested relation with a supporting body and a reciprocable wedging member telescopes the tooth so that, upon relative movement in one direction, the tooth element is wedged to the body and, upon relative movement in an opposite direction, the tooth element is released for removal from the body.

Summary of objects and features of the invention

An object of the invention is to provide a simplified way of securing and releasing a digger tooth to and from a supporting body or element.

Another object of the invention is to provide a digger assembly with a manually operable member for releasing the wedging of a digger tooth to its supporting body whereby the tooth may be easily and quickly removed and replaced.

Still another object of the invention is to provide a manually releasable assembly for a digger tooth which permits replacement of the tooth element and wherein the replacement is automatically wedged in digging position when the digger tooth is pressed toward its support.

In accordance with the general features of this invention, there is provided a digger tooth assembly comprising a tooth supporting body, a tooth element having an end telescoped by an end of the body and a reciprocable wedging member telescoping the body from the other end of the body for effecting wedging of the tooth element end to the body upon relative movement of the body and element in one direction and for releasing the tooth element for removal upon relative movement of the body and member in an opposite direction.

In accordance with other features of the invention, there is provided a digger tooth assembly comprising a tooth supporting body having a tooth receiving portion, a tooth element detachably engaged with the body portion, a reciprocable member projecting through a bore in the body and into engagement with the tooth element, wedging means including at least one wedge element in the body and disposed in a recessed portion of the member, the recess being defined at least in part by a cam surface for camming the wedge element in the body against the tooth element upon relative movement of the tooth element and body in their interengagement to secure the tooth element to the body, the reciprocable member being movable toward the tooth element to dislodge the wedge element from the securing position to release the tooth element so that it can be removed from the body.

Other features of the invention relate to the reciprocable or wedging member having an inclined cam surface and which is slideably associated with a plurality of wedging balls adapted, upon movement of the member, to wedge the tooth element in place in its supporting body.

Other objects, features and advantages of the invention will be readily apparent from the following description of a preferred embodiment thereof, taken in conjunction with the accompanying drawings although variations and modifications may be effected without departing from the spirit and scope of the novel concept of the disclosure.

Description

Figure 1:
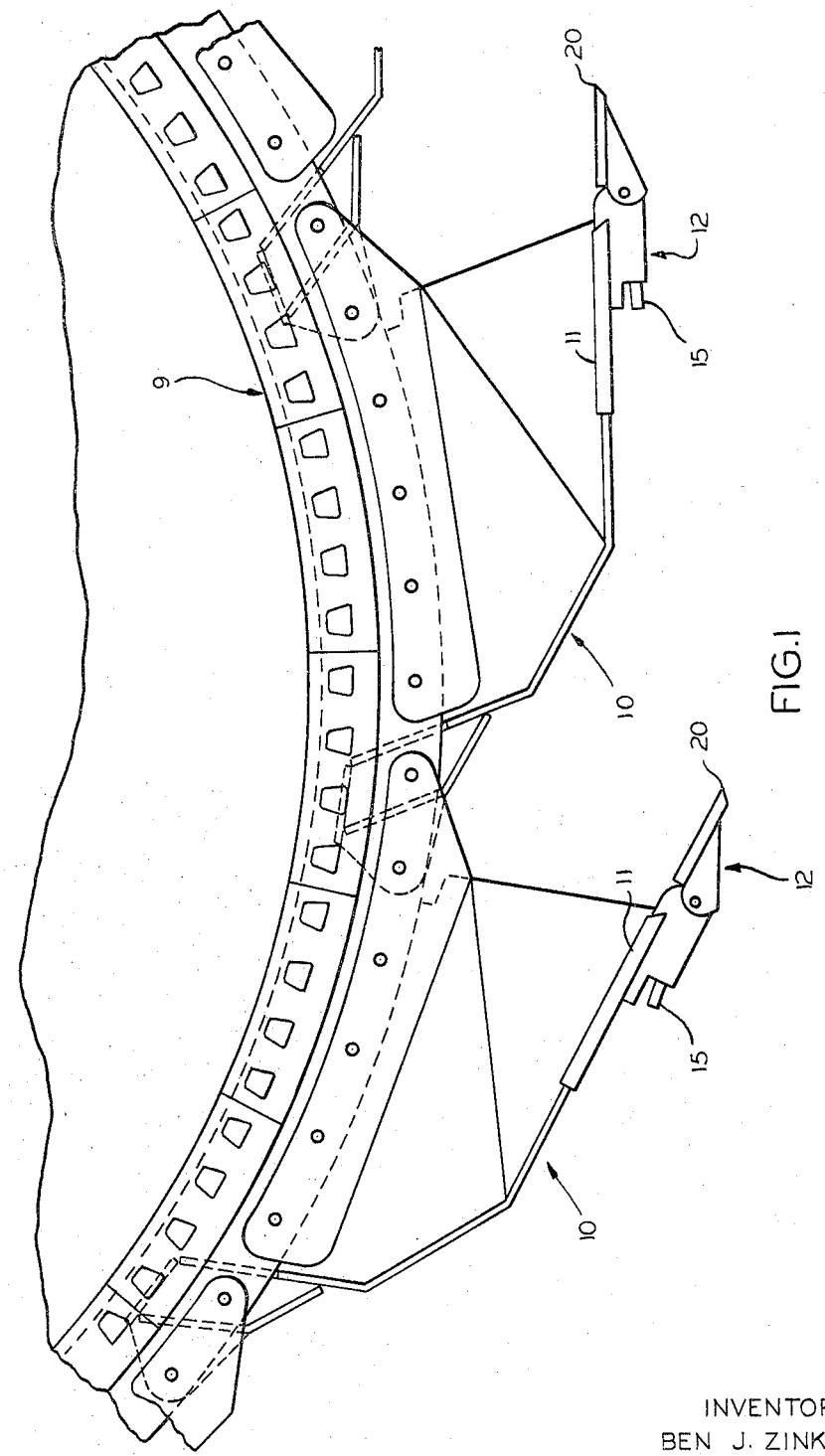
FIGURE 1 is a fragmentary side view of a conventional chain-type digger showing for illustration only two buckets, each of which is equipped with a tooth assembly of this invention.

The reference character 9 designates generally a more or less conventional type of digger chain carrying a series of digger buckets 10, only two of which are shown for purposes of illustration in FIGURE 1. Each bucket 10 has a reinforced front edge 11 to which is secured my novel digger tooth assembly designated generally by the reference character 12. This assembly includes a relatively solid body or element 13, except for the tubular bore 14 therein. The body 13 may be secured in any suitable way as by means of welding, to the bucket edge portion 11.

Figure 2:
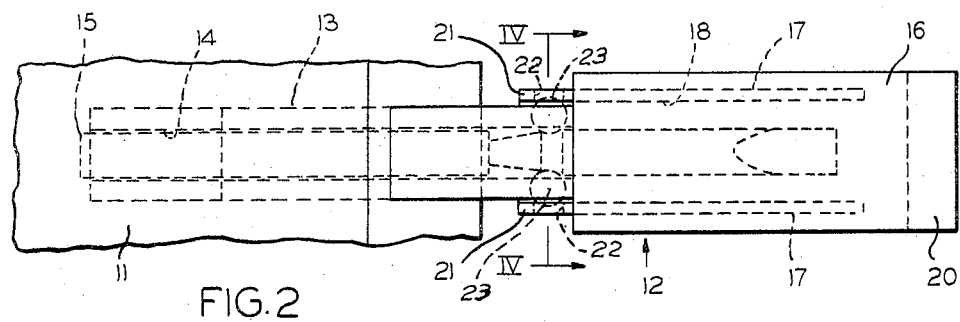
FIGURE 2 is a fragmentary plan view looking downwardly on one of the digger tooth assemblies shown on a bucket in FIGURE 1.

Positioned in and telescoping the bore 14 of the body 13 is a reciprocable tooth wedging and releasing member 15 which telescopes at its forward end the bottom of a tooth element 16. Actually, the bottom of the metal tooth element 16 has a hollow metal portion 17 in which the forward pointed end 19 of the member 15 projects for engagement, as shown in FIGURE 2, with the tooth element. The tooth element has the usual tapered cutting or digging end 20.

Figure 3:
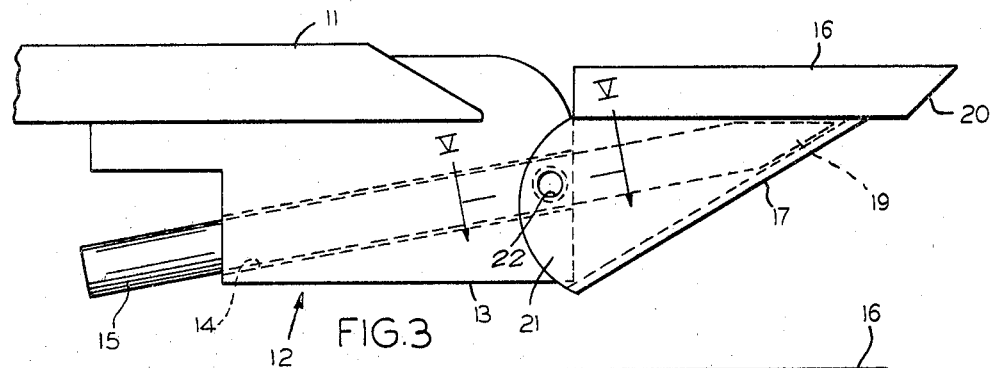
FIGURE 3 is a fragmentary side view of the digger tooth assembly shown in FIGURE 2.
Figure 5:
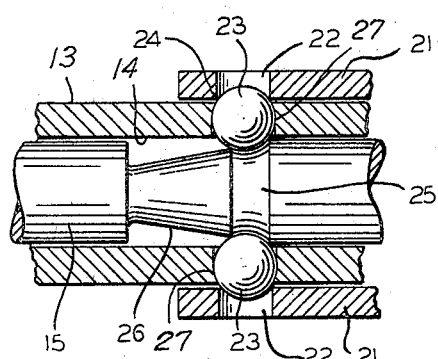
FIGURE 5 is a fragmentary cross-sectional view taken on the line V—V of FIGURE 3 looking in the direction indicated by the arrows.

The bottom portion 17 of the tooth 16 is integral with the tooth, although in practice it may be separately fabricated and welded to the tooth if so desired. This bottom portion 17 has a pair of rearwardly projecting spaced wings 21—21 telescoped by and nested over the forward end of the body 13 (FIGURES 3 and 5).

Each wing 21 has a transverse opening 22 into which a metallic ball 23 is adapted to project and engage the inner surface 24 of opening 22. The wing, being made of metal, can possess a limited amount of resiliency so that the edge 24 can have resilient engagement with the ball 23. The two balls 23—23, cooperating with the wings 21—21, are disposed on diametrically opposite sides of the wedging and releasing member 15 and are arranged to be seated in a groove cut in a reduced intermediate portion of the member 15. This groove, at its rearward side, merges into the upper end of a tapered or conical surface 26, also formed in a reduced intermediate portion of member 15.

Figure 4:
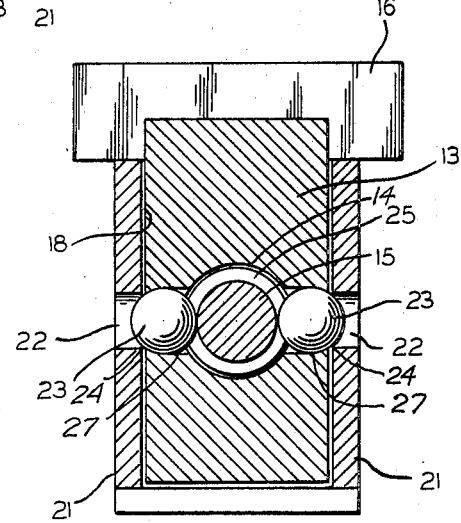
FIGURE 4 is a cross-sectional view taken generally on the line IV—IV of FIGURE 1 looking in the direction indicated by the arrows.

It will be noted that the body 13, at an intermediate portion of its bore 14, has diametrically opposed recesses 27—27 (FIGURE 4) in which the balls 23 are positioned for engagement in the groove 25 and with the edge surfaces 24—24 of the wings 21—21.

In the assembly of the device, the balls 23—23 are first disposed in the recesses 27—27 of the body member 13. Then the reciprocable or wedging member 15 is inserted in the lower end (FIGURE 3) of the body bore 14 and moved forwardly therein until the balls are resting on the inclined surface 26. In this position, the forward pointed end 19 of the member 15 projects beyond the body 13.

Thereafter, tooth element 16, and more particularly its wings 21—21, is telescoped over the forward end of the body 13 until the balls snap into the openings 22—22.

In this respect, it will be appreciated that in this mounting of the tooth element 16 on the supporting body, the pointed end 19 of member 15 first contacts the underside of the tooth element 16 so that it is thereafter moved rearwardly which causes the balls to move radially outwardly in openings 27—27 in body member 13 until they are seated in groove 25. In this position, they project beyond the body so that the wings 21—21 of the tooth element can be snapped thereover to lodge the balls 23—23 in the openings 22—22 of the tooth element.

In this position, the tooth element is firmly wedged or secured to the body member. Further digging pressure on the end 20 of the tooth only serves to press the balls 23—23 more firmly into position.

When the tooth element is worn away at its digging end 20, it is a simple matter to remove it for replacement. Removal can be effected by tapping on the end of the member 15 with a hammer, thus causing the member 15 to move the tooth element 16 off of the balls which are allowed to slide down the inclined surface 26 of member 15. In the course of this movement, the balls are necessarily moved inwardly away from the recesses 22—22 in the tooth element wings 21—21. Thus, the tooth element 16 is dislodged from nested relation with the body 13 and a replacement can be effected for it. The replacement is applied in the same manner as previously described in connection with the mounting of the tooth element on the body 13.

I claim as my invention:

1. A digger tooth assembly comprising:
   a tooth supporting body having a tooth receiving portion,
   a tooth element detachably engaged with said body portion,
   a reciprocable member projecting through a bore in said body and into engagement with the tooth element, wedging means including at least one wedge element in the body and disposed in a recessed portion of said member,
   said recessed portion being defined at least in part by a cam surface for camming the wedge element in said body against said tooth element upon movement of said reciprocable member caused by the relative movement of the tooth element and the body in their interengagement to secure the tooth element to the body, and
   said reciprocable member being movable toward the tooth element to permit dislodgement of said wedge element from the securing position to release the tooth element so that it can be removed from the body.

2. The assembly of claim 1 further characterized by the tooth element being in telescoping relation with the body and being provided with a transverse opening in which the wedge element projects on one side and which wedge element on its other side is engaged by the cam surface of the reciprocable member.

3. The assembly of claim 2 further characterized by said wall of the supporting body having an opening opposite the wedge element through which the wedge element projects for engagement with the edge of the transverse opening in the tooth element.

4. The assembly of claim 1 further characterized by the wedging means including another wedge element in engagement with said cam surface on a side opposite to that engaged by said first mentioned wedge element.

5. The assembly of claim 4 further characterized by the wedge elements comprising metallic balls on opposite sides of the cam surface of the reciprocable member engageable in a groove at a high end of the cam surface which surface is inwardly inclined therefrom so that the balls can travel downwardly on the incline of the surface when the reciprocable member is moved to dislodge the tooth element from wedged engagement with the body.

6. The assembly of claim 1 further characterized by the tooth element having a resilient edge for engagement with the wedge element and which edge is yieldable by wedging pressure of the wedge element thereagainst when the wedging element is cammed into position for securing the tooth element to the body.

7. A digger tooth assembly comprising:
   a tooth supporting body element,
   a tooth element, one of said elements having an end portion telescoped by one end of the other element, and
   a reciprocable wedging member telescoping said other element from the other end of said other element and being movable with said one element, said wedging member including an inclined cam surface and wedging element both supported by said other element, said wedging element being engageable with said cam surface and an internal surface of said one element, said wedging element being positioned such that relative telescoping movement in one direction between said tooth supporting body element and said tooth element causes said cam surface to move said wedging element to engage said one element and thereby secure the tooth element and body element together, and relative movement between said tooth supporting body element and said tooth element in the opposite direction from said relative telescoping movement moves said cam surface to permit said wedging element to disengage from said one element and thereby release the tooth element from the body element.

8. A digger tooth assembly according to claim 7 wherein said end of said one element is the tooth element end having an internal springy edge and said wedging element being disposed between said edge and the wedging member, and which wedging element upon wedging pressure against said edge causes the edge to yield so as to have tight contact with the wedging element.

9. A digger tooth assembly according to claim 7 further characterized by said wedging element comprising balls and by said cam surface including at one end a groove, said balls being arranged to seat in said groove on opposite sides of the wedging member when the tooth element is wedged to the body element.

10. A digging assembly according to claim 9 wherein said element is said tooth element and wherein said other element is said tooth supporting body element.

References Cited

UNITED STATES PATENTS

| | | | |
|---|---|---|---|
| 2,435,846 | 2/1948 | Robertson | 37—142 |
| 2,925,673 | 2/1960 | Sennholtz | 37—142 |
| 3,206,878 | 9/1965 | Penote et al. | 37—142 XR |
| 3,247,941 | 4/1966 | Beattie et al. | 197—55 |
| 3,325,926 | 6/1967 | Wilson | 37—142 |

EDGAR S. BURR, Primary Examiner

U.S. Cl. X.R.

37—189

PO-1050
(5/69)

UNITED STATES PATENT OFFICE
CERTIFICATE OF CORRECTION

Patent No. 3,481,057        Dated December 2, 1969

Inventor(s) BEN J. ZINK

It is certified that error appears in the above-identified patent and that said Letters Patent are hereby corrected as shown below:

Column 2, line 12, "tne" should read --the--;

line 53, "25" should be inserted after --groove--;

line 68, "tne" should read --the--.

Column 3, line 2, "13" should be inserted after --body--;

Column 4, line 53, "one" should be inserted before --element-- (first occurrence)

SIGNED AND SEALED
JUN 9 1970

(SEAL)
Attest:

Edward M. Fletcher, Jr.
Attesting Officer

WILLIAM E. SCHUYLER, JR.
Commissioner of Patents